United States Patent Office 2,819,238
Patented Jan. 7, 1958

2,819,238

EPOXY MODIFIED UREA-FORMALDEHYDE CONDENSATION PRODUCT AND METHOD OF MAKING SAME

Raymond G. Hart and Clarence J. Gardner, Jr., Bainbridge, N. Y., assignors to The Borden Company, New York, N. Y., a corporation of New Jersey No Drawing. Application May 21, 1954
Serial No. 431,594

2 Claims. (Cl. 260—29.4)

The invention here presented discloses a new type of nitrogenous thermosetting resin and a process for the manufacture thereof. These resins are characterized by an unusually high solubility even when highly condensed, and show a cationic charge on the molecules of condensed resin which helps adsorption of the resins onto fibers such as paper and textiles, which resins are primarily urea-formaldehyde, co-condensed with the reaction product prepared from a polyhydric alcohol, a halo epoxy alkane with a polyamine compound.

The urea-formaldehyde resins are well, favorably, and widely known, both as adhesives and as molding compositions, but they have many shortcomings, not the least of which is their unavailability as adsorbable materials.

The present invention provides a resin having a cationic charge which is valuable in promoting adsorption and many other properties of the resins. The resin shows a very high solubility in water even when condensed to a molecular weight at which most resins are completely water insoluble, and is of good strength, good durability and highly stable chemically.

This important improvement over the prior art results from our discovery that an alkanol amine may be formed from a halo epoxy alkane with a polyamine and a polyhydric alcohol. All three of these substances strongly promote both the condensation, the water solubility and the ionic content.

The reaction product of the halo epoxy alkane, polyhydric alcohol, and polyamine, effected as described herein, is considered to be of the nature of a polyhydric ether of an alkanolamine

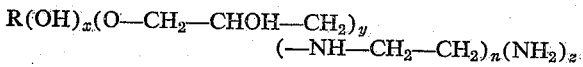

where $x$ is at least 2, $y$ and $n$ are at least 1, and $z$ is at least ½, and R is a hydrocarbon radical.

The products of this type reaction when incorporated into a urea and formaldehyde composition as set forth in our invention results in a product which is hydrophilic, cationic and substantive to a wide variety of materials, and in addition is very reactive in the presence of acid and alkali catalyst or by heat alone or in combination with either type of catalyst. The products therefore find utility in such unrelated fields as paper, wood gluing, foundry applications and the adhesive field as set forth in detail in the following specifications.

The primary component of the invention is aminoaldehyde composition. The preferred amine is urea, but other substances such as thiourea, guanidine and the mono-substituted ureas are also useful. The preferred aldehyde is formaldehyde, including its polymers wholly or in part, but other aldehydes in general are also useful, including acetaldehyde, propionaldehyde, butyraldehyde and furfuraldehyde. These components, a selected amine and a selected aldehyde, may be mixed in proportions over a considerable range without departing from the scope of the invention. Thus, the ratio of aldehyde to amido compound may vary between 1.5 to 1.0 and 4.0 to 1.0, the preferred proportion being within the range between 1.9 to 1.0 and 3.0 to 1.0. The mixture is desirably prepared with an appropriate amount of water and heated to a temperature range between about 40° C. and the boiling point of the solution. Either acid or alkaline condensation may be utilized, and the condensation may be carried on at any desired pH within the range between 1.5 to 10.0, the heating being conducted until the condensation reaches the stage where the solution is moderately viscous.

The second component of our reaction is the triple condensate of a polyhydric alcohol with an epichlorohydrin and a polyamine. Suitable polyhydric alcohols are glycerol, sorbitol, mannitol, trimethylol ethane, trimethylol propane, ethylene glycol, pentaerythritol and their homologs. The epichlorohydrin may be the chlorohydrin itself or any of its reactive homologs. For the polyamine, any of the diamines, triamines, or pentamines may be used. In the preparation of this second component, there is first prepared a mixture containing from ⅓ mol to 1 mol of the polyhydric alcohol with 1 mol of the chlorohydrin. This mixture is acidified with an acid catalyst such as sulfuric acid and the mixture is then heated until a substantial amount of condensation occurs. There is then added to the mixture 1 mol of the polyamine and the heating continued until a substantial condensation has occurred.

The urea and formaldehyde are then mixed with the polyalcohol, chlorohydrin, and amine condensate, in the ratio of about 1 part of the condensate per 3 parts of the urea represented, in the urea-formaldehyde condensate and the condensation of the mixture continued at a pH within the range between 1.5 and 6.5, the preferred range being between 5.0 and 5.5 at a temperature within the range of 40° C. and the boiling point of the mixture.

The condensation may be carried to any desired stage depending upon the use to which the product is to be put. As the condensation reaction continues, the viscosity of the reaction mixture increases slowly and it may be utilized as an indication of the extent of the condensation. When the desired condensation stage is reached, as indicated by the viscosity, the condensation reaction may be stopped by adding sufficient alkali to bring the pH into the range between 7.0 and 8.0, the preferred alkali being sodium hydroxide, although many other alkalies such as sodium carbonate, triethanol amine, or the like may be used.

The details of the procedure are given in the following examples which are offered for the purpose of illustration of the scope of the invention.

Example 1

A suitable reactor having a reflux condenser and appropriate delivery and discharge connections, as well as a stirrer and a thermometer well, was fitted with a source of heat, and to it there were added two moles of epichlorohydrin, 11 mols of water and one mol of trimethylol ethane. To this there was added two-tenths percent of concentrated sulfuric acid. The mixture was then heated to 70° C.–80° C. whereupon an exothermic reaction ensued causing the alcohol and the epichlorohydrin to combine. The temperature gradually rose to about 103° C. and the reaction slowed. Heat was then applied to reflux temperature and the reaction allowed to proceed at reflux for one hour. After this period, one mol of diethylene triamine was slowly added over a period of one hour at the reflux temperature. When the amine addition was complete, the mixture was heated at reflux for one-half hour. The resulting product was an orange colored viscous material, exhibiting high solubility in water.

It may be noted that the polyamine used may be a diamine, triamine or pentamine. This procedure completes the first stage of the reaction.

Example II

To a three-necked flask equipped with a water cooled condenser, a motor driven stirrer and thermometer well, there were added 10.7 mols of formaldehyde (44% solution), 5.0 moles of urea, and 33% of the nitrogen-containing modifier from Example I, by weight, based on the weight of urea. The pH was adjusted to 7.2–7.4 with sodium hydroxide 50% solution and the contents brought to reflux and maintained until a cloud point of 35° C. was obtained, indicating that the appropriate dimethylol urea stage was reached. The pH was immediately adjusted to 5.5–6.0 by means of a 25% formic acid solution and the resin allowed to condense to a viscosity of "K" to "L," on the Gardner-Holdt scale. The resin was then adjusted to a pH of 7.4–7.5 with a 10% solution of sodium hydroxide and the solids adjusted to 40% by the addition of water.

Example III

To a three-necked flask fitted as in Example II, there were added 10.7 mols of formaldehyde (44% solution), 5.0 mols of urea, 16.6 mols of water, and 33% of the nitrogen-containing product, from Example I, on the weight of the urea. The pH was adjusted to 7.2 to 7.4 with sodium hydroxide and heated to a temperature of 60° C. The mixture was held at 70° C. for 15 minutes at which time heat was applied to raise the temperature to the boiling point. The mixture was maintained at reflux for a period of 15 minutes and the pH adjusted to 5.5–6.0 with a 25% formic acid solution. The resin was allowed to condense to a viscosity of "E" to "F" on the Gardner-Holdt scale. The resin was then adjusted to a pH of 6.7 to 7.2 by means of a 50% solution of sodium hydroxide.

Example IV

Alternatively, the second stage was repeated using 5.5 mols of water instead of 16.6 mols of Example III. An equally satisfactory resin was obtained.

Example V

A sample of bleached kraft pulp was beaten to a freeness of 500 ml. (Canadian Standard). To this pulp there was added a 10% alum solution to bring the pH to a point within the range between 4.5 and 4.7. To this pulp mixture there was then added a sufficient amount of a 5% solution of resin from Example II to give a concentration of resin solids of ½% to 3% on the dry pulp. Test sheets were then made from this pulp mixture which were then dried on a drum drier for 5 minutes at 240° F. and then further heated for 15 minutes at 240° F. in an air circulating oven. Strips were then cut from the dry paper, part of which were then soaked in water for one hour and tested for tensile strength. The following strengths were obtained:

| Resin Solids Furnished | Dry Tensile, Lbs./in. | Wet Tensile, Lbs./in. | WT/DT, percent |
|---|---|---|---|
| ½ | 24.9 | 5.8 | 23.3 |
| 1 | 29.4 | 8.8 | 29.9 |
| 2 | 25.5 | 9.6 | 37.6 |
| 3 | 26.2 | 11.0 | 42.0 |

These results show the excellent wet strength in the treated sheets.

Example VI

To a three-necked flask equipped with a water cooled condenser, a motor driven stirrer and thermometer well, there were added 10.7 mols of formaldehyde, 5.0 mols of urea and 33% of the modifier from Example I by weight, based on the weight of urea. The pH was adjusted to 7.8–8.0 with sodium hydroxide 50% solution and the contents heated to reflux temperature. The pH was then adjusted to 6.0–6.5 with formic acid 25% solution and the resin allowed to condense to a viscosity of K–L on the Gardner-Holdt scale. The resin was then adjusted to a pH of 7.2–7.4 with sodium hydroxide 50% solution and 0.75 mol of urea added. The solids were then adjusted to 40% by the addition of water.

Example VII

A batch of resin made according to the provisions of Example IV showed the following physical properties: pH 6.8, viscosity by Brookfield instrument at 20 R. P. M.—44 centipoises, solids content 40.6%, and infinitely able to be diluted with water. Furthermore, this resin contained little or no unreacted formaldehyde thus providing a foundry sand core binder in the form of a resin of no objectionable odor. The sand mix comprised:

| | | |
|---|---|---|
| Nevada sand | lbs | 300 |
| Corn flour | lbs | 2 |
| Resin | lbs | 12 |
| Stearic acid | oz | 2 |
| Kerosene | lbs | 2 |
| Water | lbs | 8 |

The sand mix was observed by the coremakers to lack the characteristic objectionable odor of ordinary urea-formaldehyde resin and to have excellent molding qualities. Cores were formed of a design to produce aluminum aircraft cylinder liners; they were oven-baked in the conventional manner and inserted in the molds. Upon pouring these molds a mild burning odor and the development of only a slight amount of smoke were experienced. The castings were inspected and judged to be of high quality.

Example VIII

The resin of Example IV was taken into jobbing foundry which makes castings of a great variety of designs. Cores were formed from a mix comprising:

| | | |
|---|---|---|
| McConnellsville sand | lbs | 600 |
| Corn flour | lbs | 3 |
| Boric acid | lbs | 1 |
| Resin | qts | 2 |
| Stearic acid | oz | 6 |
| Kerosene | qts | 1½ |
| Water | qts | 7 |

The experiment differed from the previous experiments primarily in that the cores were cured dielectrically instead of being baked in an oven. The source of high frequency current was a generator of Thermex make of 15 kw. capacity. This method of curing cores is very fast, the green or wet core being converted to a dry and hard state in 1 to 2 minutes. The purpose of the experiment was to determine the ability of the new resin to cure by this method, and it was successful, good cores being obtained in the expected short curing time.

Example IX

The resin of Example IV was taken into an iron foundry making gray iron pipe fittings. The sand mix for cores comprises:

| | | |
|---|---|---|
| Core sand | lbs | 1200 |
| Corn flour | lbs | 12 |
| Resin | qts | 14 |
| Stearic acid | oz | 12 |
| Fuel oil | qts | 4 |

Water to 6% moisture content.

Cores were formed and baked to dryness with the observation made that odors were less and the cores harder than when an ordinary urea-formaldehyde resin is used in this sand mix formula. Because of these advantages, the foundry management approved the new resin as replacement for the old in regular production.

Example X

A sample of resin produced according to the method of Example VI was spray dried under the following conditions:

Useful heat _____ 100° F.–130° F.
Rate of feed _____ 500 lbs. per hour.

The resulting powder was infinitely soluble in water, had no odor of formaldehyde and showed no evidence of caking.

Example XI

A sample of the resin from Example III was incorporated into an adhesive for corrugating using the following formula:

A. Mix: 36 lbs. 50 fluidity corn starch
125 lbs. water
Then add slowly the following solution:
3.7 lbs. caustic soda
35.0 lbs. water
Mix approximately 20′ and add to part B.
B. 350 lbs. water
200 lbs. pearl corn starch
After adding A add 25 lbs. of resin from Example III.

(Equivalent to 4% of dry U. F. resin on starch content.)

The above adhesive, when applied to the corrugations of a box board and cured, showed excellent resistance to water.

The composition of the invention thus is a new multi-component synthetic resin, suitable for use in a wide variety of materials.

While there are above disclosed but a limited number of embodiments of the present invention, it is possible to provide other embodiments without departing from the inventive concept herein disclosed, and it is therefore desired that only such limitations be imposed upon the appended claims as are stated therein or required by the prior art.

The invention claimed is:

1. The process of making a water soluble cationic condensation product which comprises mixing (1) the partially condensed water soluble viscous cationic material, resulting from forming an aqueous solution of ⅓–1 mole of an aliphatic polyhydric alcohol, 1 mole of epichlorohydrin and an acid in amount to acidify the solution, heating the acidified solution until the resulting exothermic reaction becomes slow, then adding about 1 mole of an aliphatic polyamine and continuing the heating until a partially condensed water soluble viscous cationic material results, with (2) formaldehyde and urea in the proportion of 1.5–4 moles of formaldehyde to 1 mole of urea, the proportion of the said viscous cationic material being about 1 part by weight to 3 parts of the urea, heating the resulting mixture at a temperature between about 40° C. and the boiling point of the said mixture and at a pH of 1.5–10, continuing the heating until the resulting condensation produces a viscous solution, then discontinuing the heating and adjusting the pH to 7–8.

2. The product obtained by the process of claim 1.

References Cited in the file of this patent
UNITED STATES PATENTS

| | | |
|---|---|---|
| 2,497,073 | Dudley et al. | Feb. 14, 1950 |
| 2,528,359 | Greenlee | Oct. 31, 1950 |
| 2,528,360 | Greenlee | Oct. 31, 1950 |
| 2,554,475 | Suen et al. | May 22, 1951 |